US008094729B2

(12) United States Patent
Haskell et al.

(10) Patent No.: US 8,094,729 B2
(45) Date of Patent: *Jan. 10, 2012

(54) METHOD AND APPARATUS FOR VARIABLE ACCURACY INTER-PICTURE TIMING SPECIFICATION FOR DIGITAL VIDEO ENCODING WITH REDUCED REQUIREMENTS FOR DIVISION OPERATIONS

(75) Inventors: Barin Geoffry Haskell, Mountain View, CA (US); David William Singer, San Francisco, CA (US); Adriana Dumitras, Santa Clara, CA (US); Atul Puri, Redmond, WA (US)

(73) Assignee: Apple Inc., Cupertino, CA (US)

( * ) Notice: Subject to any disclaimer, the term of this patent is extended or adjusted under 35 U.S.C. 154(b) by 1235 days.

This patent is subject to a terminal disclaimer.

(21) Appl. No.: 11/621,979

(22) Filed: Jan. 10, 2007

(65) Prior Publication Data
US 2007/0183502 A1  Aug. 9, 2007

Related U.S. Application Data

(63) Continuation of application No. 10/792,514, filed on Mar. 2, 2004, now Pat. No. 7,339,991, which is a continuation of application No. 10/313,773, filed on Dec. 6, 2002, now Pat. No. 6,728,315.

(60) Provisional application No. 60/398,625, filed on Jul. 24, 2002.

(51) Int. Cl.
 *H04N 7/12* (2006.01)
(52) U.S. Cl. .............................. 375/240.26; 375/240.15
(58) Field of Classification Search ............. 375/240.15, 375/240.25, 240.26; 386/346
See application file for complete search history.

(56) References Cited

U.S. PATENT DOCUMENTS

| 5,394,190 | A |   | 2/1995 | Yamada |            |
|-----------|---|---|--------|--------|------------|
| 5,398,072 | A | * | 3/1995 | Auld   | 375/240.25 |
| 5,436,664 | A |   | 7/1995 | Henry  |            |
| 5,483,286 | A |   | 1/1996 | Kim    |            |
| 5,502,493 | A | * | 3/1996 | Meyer  | 375/240.26 |

(Continued)

FOREIGN PATENT DOCUMENTS

AU        2003256494        2/2004

(Continued)

OTHER PUBLICATIONS

U.S. Appl. No. 11/779,660, filed Jul. 2007, Haskell et al.

(Continued)

*Primary Examiner* — Gims Philippe
(74) *Attorney, Agent, or Firm* — Adeli & Tollen, LLP

(57) ABSTRACT

A method and apparatus for performing motion estimation in a digital video system is disclosed. Specifically, the present invention discloses a system that quickly calculates estimated motion vectors in a very efficient manner. In one embodiment, a first multiplicand is determined by multiplying a first display time difference between a first video picture and a second video picture by a power of two scale value. This step scales up a numerator for a ratio. Next, the system determines a scaled ratio by dividing that scaled numerator by a second first display time difference between said second video picture and a third video picture. The scaled ratio is then stored calculating motion vector estimations. By storing the scaled ratio, all the estimated motion vectors can be calculated quickly with good precision since the scaled ratio saves significant bits and reducing the scale is performed by simple shifts.

8 Claims, 4 Drawing Sheets

U.S. PATENT DOCUMENTS

| | | | |
|---|---|---|---|
| 5,647,049 | A | 7/1997 | Odaka et al. |
| 5,737,023 | A | 4/1998 | Linzer |
| 5,745,183 | A | 4/1998 | Lam |
| 6,018,368 | A | 1/2000 | Kim et al. |
| 6,040,861 | A | 3/2000 | Boroczky et al. |
| 6,072,834 | A | 6/2000 | Kim et al. |
| 6,075,576 | A | 6/2000 | Tan et al. |
| 6,088,485 | A | 7/2000 | Kadono |
| 6,108,047 | A | 8/2000 | Chen |
| 6,219,103 | B1 | 4/2001 | Sugiyama |
| 6,271,774 | B1 | 8/2001 | Kato |
| 6,295,377 | B1 | 9/2001 | Dufaux et al. |
| 6,297,852 | B1 | 10/2001 | Laksono et al. |
| 6,317,460 | B1 | 11/2001 | Lee |
| 6,339,619 | B1 | 1/2002 | Sugiyama |
| 6,393,059 | B1 | 5/2002 | Sugiyama |
| 6,400,768 | B1 | 6/2002 | Nagumo et al. |
| 6,552,749 | B1 | 4/2003 | Jones et al. |
| 6,728,315 | B2 | 4/2004 | Haskell et al. |
| 6,757,014 | B1 | 6/2004 | Kasahara |
| 6,859,609 | B1 | 2/2005 | Watkins |
| 6,937,771 | B2 | 8/2005 | Kondo et al. |
| 7,088,776 | B2 | 8/2006 | Haskell et al. |
| 7,257,312 | B2 * | 8/2007 | Lin et al. ............ 386/346 |
| 7,266,150 | B2 * | 9/2007 | Demos .............. 375/240.15 |
| 7,292,636 | B2 | 11/2007 | Haskell et al. |
| 7,339,991 | B2 | 3/2008 | Haskell et al. |
| 7,548,584 | B2 | 6/2009 | Haskell et al. |
| 7,551,674 | B2 | 6/2009 | Haskell et al. |
| 7,668,240 | B2 | 2/2010 | Haskell et al. |
| 7,801,217 | B2 | 9/2010 | Boyce |
| 7,826,528 | B2 | 11/2010 | Haskell et al. |
| 7,903,730 | B2 | 3/2011 | Haskell et al. |
| 8,009,736 | B2 | 8/2011 | Haskell et al. |
| 8,009,737 | B2 | 8/2011 | Haskell et al. |
| 2003/0202586 | A1 | 10/2003 | Jeon |
| 2004/0234143 | A1 | 11/2004 | Hagai et al. |
| 2004/0247031 | A1 | 12/2004 | Hagai et al. |
| 2007/0183492 | A1 | 8/2007 | Haskell et al. |
| 2007/0183501 | A1 | 8/2007 | Haskell et al. |
| 2007/0183503 | A1 | 8/2007 | Haskell et al. |
| 2007/0189378 | A1 | 8/2007 | Haskell et al. |
| 2007/0189379 | A1 | 8/2007 | Haskell et al. |
| 2007/0274394 | A1 | 11/2007 | Haskell et al. |
| 2007/0274395 | A1 | 11/2007 | Haskell et al. |
| 2007/0274677 | A1 | 11/2007 | Haskell et al. |
| 2007/0274678 | A1 | 11/2007 | Haskell et al. |
| 2007/0286282 | A1 | 12/2007 | Haskell et al. |
| 2009/0022224 | A1 | 1/2009 | Haskell et al. |
| 2009/0022225 | A1 | 1/2009 | Haskell et al. |
| 2010/0183073 | A1 | 7/2010 | Haskell et al. |
| 2011/0085594 | A1 | 4/2011 | Haskell et al. |

FOREIGN PATENT DOCUMENTS

| | | |
|---|---|---|
| AU | 2003258142 | 6/2004 |
| AU | 2008201106 | 4/2008 |
| AU | 2009202255 | 7/2009 |
| CA | 2491741 | 1/2004 |
| CA | 2502004 | 6/2004 |
| EP | 1014729 | 6/2000 |
| EP | 1111934 | 6/2001 |
| EP | 1120969 | 8/2001 |
| EP | 1 406 453 | 4/2004 |
| EP | 1532746 | 5/2005 |
| EP | 1579689 | 9/2005 |
| EP | 1976299 | 10/2008 |
| EP | 2276180 | 1/2011 |
| EP | 2276181 | 1/2011 |
| EP | 11155447 | 2/2011 |
| EP | 11155484 | 2/2011 |
| EP | 11155497 | 2/2011 |
| EP | 2317662 | 5/2011 |
| EP | 2326019 | 5/2011 |
| EP | 2326020 | 5/2011 |
| EP | 2328277 | 6/2011 |
| EP | 2328278 | 6/2011 |
| EP | 2328279 | 6/2011 |
| EP | 2328281 | 6/2011 |
| EP | 2328282 | 6/2011 |
| EP | 2328283 | 6/2011 |
| EP | 2328284 | 6/2011 |
| EP | 11155463 | 6/2011 |
| EP | 234826 | 7/2011 |
| EP | 234896 | 7/2011 |
| EP | 2343815 | 7/2011 |
| EP | 2343816 | 7/2011 |
| EP | 2343817 | 7/2011 |
| EP | 2343818 | 7/2011 |
| EP | 2343819 | 7/2011 |
| EP | 2343820 | 7/2011 |
| EP | 2343821 | 7/2011 |
| EP | 2343822 | 7/2011 |
| EP | 2343823 | 7/2011 |
| EP | 2343824 | 7/2011 |
| EP | 2343825 | 7/2011 |
| EP | 2343827 | 7/2011 |
| EP | 2343828 | 7/2011 |
| EP | 2343829 | 7/2011 |
| EP | 2343830 | 7/2011 |
| EP | 2346177 | 7/2011 |
| EP | 2346178 | 7/2011 |
| EP | 2346179 | 7/2011 |
| EP | 2346180 | 7/2011 |
| EP | 2346181 | 7/2011 |
| EP | 2346182 | 7/2011 |
| EP | 2346183 | 7/2011 |
| EP | 2346184 | 7/2011 |
| EP | 2346185 | 7/2011 |
| EP | 2346186 | 7/2011 |
| EP | 2346187 | 7/2011 |
| EP | 2363963 | 9/2011 |
| JP | H06-319112 | 11/1994 |
| JP | 10-174065 | 6/1998 |
| JP | 10-215449 | 8/1998 |
| JP | 2001-005958 | 1/2001 |
| JP | 2001-069530 | 3/2001 |
| JP | 2001-136528 | 5/2001 |
| KR | 1999-0036646 | 5/1999 |
| KR | 1999-0078197 | 10/1999 |
| KR | 10-0274434 | 12/2000 |
| KR | 2001112806 | 12/2001 |
| SG | 110332 | 4/2007 |
| SG | 112223 | 1/2008 |
| WO | WO 2004/008654 | 1/2004 |
| WO | WO 2004/032357 | 4/2004 |
| WO | WO 2004/054257 | 6/2004 |

OTHER PUBLICATIONS

U.S. Appl. No. 11/779,668, filed Jul. 2007, Haskell et al.
Rob Koenen, "Overview of the MPEG-4 standard," in ISO/IEC JTC1/SC29/WG11 N4668, Mar. 2002.
ITU-T, "Video coding for low bit rate communication," Recommendation H.263, 1996.
ITU-T, "Video coding for low bit rate communication," Recommendation H.263 Version 2, 1998.
Guy Cote, Berna Erol, Michael Gallant, and Faouzi Kossentini, "H.263+: Video coding at low bit rates," IEEE Trans. on Circuits and Systems for Video Technology, vol. 8, No. 7, pp. 849-866, Nov. 1998.
Portions of prosecution history of U.S. Appl. No. 10/291,320, filed Dec. 15, 2005, Haskell, Barin Geoffry, et al.
Portions of prosecution history of U.S. Appl. No. 10/792,669, filed Jul. 20, 2007, Haskell, Barin Geoffry, et al.
Portions of prosecution history of U.S. Appl. No. 11/621,969, filed Mar. 11, 2010, Haskell, Barin Geoffry, et al.
Portions of prosecution history of U.S. Appl. No. 11/621,971, filed Mar. 9, 2010, Haskell, Barin Geoffry, et al.
Portions of prosecution history of U.S. Appl. No. 11/621,974, filed Sep. 30, 2009, Haskell, Barin Geoffry, et al.
U.S. Appl. No. 12/689,157, filed Jan. 18, 2010, Haskell, Barin Geoffry, et al.
Portions of prosecution history of U.S. Appl. No. 11/835,727, filed Dec. 18, 2007, Haskell, Barin Geoffry, et al.
Portions of prosecution history of U.S. Appl. No. 11/835,732, filed Dec. 18, 2007, Haskell, Barin Geoffry, et al.

Portions of prosecution history of U.S. Appl. No. 11/835,739, filed Nov. 10, 2008, Haskell, Barin Geoffry, et al.
Portions of prosecution history of U.S. Appl. No. 11/835,773, filed Nov. 10, 2008, Haskell, Barin Geoffry, et al.
Portions of prosecution history of U.S. Appl. No. 10/792,514, filed Dec. 21, 2007, Haskell, Barin Geoffry, et al.
Portions of prosecution history of U.S. Appl. No. 11/621,977, filed May 11, 2007, Haskell, Barin Geoffry, et al.
Portions of prosecution history of U.S. Appl. No. 11/621,980, filed May 11, 2007, Haskell, Barin Geoffry, et al.
Supplemental European Search Report for EP 03812763, Dec. 7, 2009 (mailing date), Apple Computer, Inc.
Author Unknown, "MPEG Continues Its Work Across All Aspects of Its Multimedia Charter", http://mpeg.chiariglione.org/meetings/klagenfurt/klagenfurt_press.htm, Jul. 29, 2002.
Wiegand, Thomas, "Text of Final Committee Draft of Joint video Specification (ITU-T Rec. H.264/ ISO/IEC 14496-10 AVC)", JVT, Jul. 2002, Klagenfurt, AT.
Schlockermann, Martin, "Improvement of Temporal Direct Mode", Joint Video Team (JVT) of ISO/IEC MPEG & ITU-T VCEG (ISO/IEC JTC1/SC29/WG11 and ITU-T SG16 Q.6), part of a conference proceeding that took place between Oct. 9 and Oct. 17, 2002 in Geneva, Switzerland.
Jeon, Byeong-Moon, "Clean Up for Temporal Direct Mode", Joint Video Team (JVT) of ISO/IEC MPEG & ITU-T VCEG (ISO/IEC JTC1/SC29/WG11 and ITU-T SG16 Q.6), part of a conference proceeding that took place between Oct. 9 and Oct. 17, 2002 in Geneva, Switzerland.
Author Unknown, "Text of Committee Draft of Joint Video Specification (ITU-T Rec. H.264/ ISO/IEC 14496-10 AVC)", JVT, part of a conference proceeding that took place between May 6 and May 10, 2002, in Fairfax, VA.
Advisory Action of U.S. Appl. No. 10/291,320, Feb. 3, 2005 (mailing Date), Haskell, Barin Geoffry et al.
Notice of Allowance of U.S. Appl. No. 11/835,739, Feb. 13, 2009 (mailing Date), Haskell, Barin Geoffry et al.
Notice of Allowance of U.S. Appl. No. 11/835,773, Feb. 6, 2009 (mailing Date), Haskell, Barin Geoffry et al.
Non-Final Office Action of U.S. Appl. No. 11/621,969, Dec. 29, 2008 (mailing date), Haskell, Barin Geoffry et al.
Restriction Requirement of U.S. Appl. No. 11/621,969, Jun. 24, 2009 (mailing date), Haskell, Barin Geoffry et al.
Restriction Requirement of U.S. Appl. No. 11/621,971, Oct. 17, 2008 (mailing Date), Haskell, Barin Geoffry et al.
Non-Final Action of U.S. Appl. No. 11/621,971, Jan. 2, 2009 (mailing Date), Haskell, Barin Geoffry et al.
Non-Final Action of U.S. Appl. No. 11/621,971, Jun. 2, 2009 (mailing Date), Haskell, Barin Geoffry et al.
Restriction Requirement of U.S. Appl. No. 11/621,974, Jan. 12, 2009 (mailing Date), Haskell, Barin Geoffry et al.
Non-Final Office Action of U.S. Appl. No. 11/621,974, Mar. 12, 2009 (mailing Date), Haskell, Barin Geoffry et al.
Supplemental European Search Report for EP03764499.4, Oct. 31, 2008 (Mailing Date), Apple Computer, Inc.
Communication for EP03764499.4, Feb. 12, 2009 (mailing date), Apple Inc.
Extended European Search Report for EP08005966.0, Oct. 31, 2008 (mailing date), Apple Computer, Inc.
Examiner's Report for Canadian Application 2491741, Jun. 9, 2008, Apple Inc.
Communication for Canadian Application 2491741, Feb. 11, 2009, Apple, Inc.
ISO/IEC, "Information Technology—coding of moving pictures and associated audio for digital storage media at up to about 1,5 mbits/s—Part 2: Video," 11172-2:1993, Aug. 2006.
ITU-T Recommendation H.264: "Advanced video coding for generic audiovisual services", May 2003; also ISO/IEC 14496-10, "Information technology—coding of audio-visual objects—Part 10: Advanced video coding", 2003.
ISO/IEC 14496-10, "Information technology—coding of audio-visual objects—Part 10: Advanced video coding," Oct. 2004.

Weigand, Thomas, "Working Draft No. 2, Revision 0 (WD-2)", JVT of ISO/IEC MPEG and ITU-T VCEG, document JVT-B118, Dec. 3, 2001.(Entire Draft).
Non-Final Office Action of U.S. Appl. No. 10/291,320, Oct. 23, 2003 (mailing date), Haskell, et al.
Final-Office Action of U.S. Appl. No. 10/291,320, Jul. 12, 2004 (mailing date), Haskell, et al.
Non-Final Office Action of U.S. Appl. No. 10/291,320, Aug. 15, 2005 (mailing date), Haskell, et al.
Notice of Allowance of U.S. Appl. No. 10/291,320, Mar. 6, 2006 (mailing date), Haskell, et al.
Notice of Allowance and Restriction Requirement of U.S. Appl. No. 10/792,669, Jun. 26, 2007 (mailing date), Haskell, et al.
Notice of Allowance of U.S. Appl. No. 10/313,773, Dec. 2, 2003 (mailing date), Haskell, et al.
Notice of Allowance of U.S. Appl. No. 10/792,514, Sep. 25, 2007 (mailing date), Haskell, et al.
Supplemental Notice of Allowability of U.S. Appl. No. 10/792,514, Nov. 5, 2007 (mailing date), Haskell, et al.
Non-Final Office Action of U.S. Appl. No. 11/835,739, Aug. 11, 2008 (mailing date), Haskell, et al.
Non-Final Office Action of U.S. Appl. No. 11/835,773, Aug. 8, 2008 (mailing date), Haskell, et al.
International Search Report for PCT/US2003/021714, Nov. 14, 2003 (mailing date), Apple Computer, Inc.
International Preliminary Examination Report for PCT/US2003/021714, Sep. 2, 2004 (mailing date), Apple Computer, Inc.
Written Opinion for PCT/US2003/021714, Apr. 21, 2004 (mailing date), Apple Computer, Inc.
International Search Report for PCT/US2003/024953, Jan. 27, 2004 (mailing date), Apple Computer, Inc.
International Preliminary Examination Report for PCT/US2003/024953, Mar. 17, 2004 (mailing date), Apple Computer, Inc.
ISO/IEC, "Information technology—coding of moving pictures and associated audio for digital storage media at up to about 1.5 mbits/s: Video," 11172-2, 1993.
ISO/IEC, "Information technology—generic coding of moving pictures and associated audio information: Video," 13818-2, 1995.
ISO/IEC 14496-2, "Information technology—coding of audio-visual objects—Part 2: Visual," 2001.
ISO/IEC 14496-10, "Information technology—coding of audio-visual objects—Part 10: Advanced video coding"; also ITU-T Recommendation H.264: "Advanced video coding for generic audiovisual services", 2003.
Multiple authors, "Special issue on the H.264/AVC video coding standard," IEEE Trans. on Circuits and Systems for Video Technology, vol. 13, No. 7, Jul. 2003.
ISO/IEC 14496-10, "Advanced Video Coding: H.264/AVC—reference software," 2002.
MPEG-4 Video Group, "MPEG-4 video verification model version 18.0," ISO/IEC JTC1/SC29/WG11 N3908, Jan. 2001.
ISO/IEC JTC 1/SC29/WG 11, "Report of the formal verification tests on AVC, document N6231," Dec. 2003.
Chen, P. Zhou, and Y. He, "Fast motion estimation for JVT," ISO/IEC JTC 1/SC29/WG11 and ITU-T SG16 Q.6, document JVT-G016, 2003.
Michael Horowitz, Anthony Joch, and F. Kossentini, "H.264/AVC Baseline Profile Decoder Complexity Analysis," IEEE Trans. on Circuits and Systems for Video Technology, vol. 13, No. 7, pp. 704-716, Jul. 2003.
Kwong-Keung Leung, Nelson H.C. Yung, Paul Y.S. Cheung, "Parallelization methodology for video coding—an implementation on TMS32OC8O," IEEE Trans. on Circuits and Systems for Video Technology, vol. 10, No. 8, pp. 1413-1425, Dec. 2000.
Weigand, Thomas, "Working Draft No. 2, Revision 0 (WD-2)", JVT of ISO/IEC MPEG and ITU-T VCEG, document JVT-B118, Mar. 13, 2002.
Updated portions of prosecution history of U.S. Appl. No. 10/291,320, filed Jan. 12, 2005, Haskell, Barin Geoffry, et al.
Updated portions of prosecution history of U.S. Appl. No. 10/792,669, filed May 24, 2007, Haskell, Barin Geoffry, et al.
Updated portions of prosecution history of U.S. Appl. No. 11/621,969, filed Dec. 2, 2010, Haskell, Barin Geoffry, et al.

Updated portions of prosecution history of U.S. Appl. No. 11/621,971, filed May 10, 2010, Haskell, Barin Geoffry, et al.
Portions of prosecution history of U.S. Appl. No. 12/689,157, filed Jul. 29, 2010, Haskell, Barin Geoffry, et al.
Updated portions of prosecution history of U.S. Appl. No. 11/835,732, filed Dec. 7, 2010, Haskell, Barin Geoffry, et al.
Updated portions of prosecution history of U.S. Appl. No. 11/835,773, filed Dec. 12, 2008, Haskell, Barin Geoffry, et al.
Updated portions of prosecution history of U.S. Appl. No. 11/621,977, filed Dec. 7, 2010, Haskell, Barin Geoffry, et al.
AU Office Action of AU2008201106, Sep. 12, 2010 (mailing date), Apple Computer, Inc.
EP Office Action of EP03764499.4, May 5, 2010 (mailing date), Apple Inc.
EP Office Action of EP03764499.4, Dec. 2, 2009 (mailing date), Apple Inc.
EP Office Action of EP08005966.0, May 12, 2010 (mailing date), Apple Inc.
SG Search Report and Written Opinion for SG 200702807-9, Jan. 6, 2010 (mailing date), Apple Inc.
U.S. Appl. No. 12/972,419, Dec. 17, 2010, Haskell, Barin Geoffry, et al.
Updated portions of prosecution history of U.S. Appl. No. 11/621,969, filed Mar. 16, 2011, Haskell, Barin Geoffry, et al.
Portions of prosecution history of U.S. Appl. No. 12/972,419, filed Mar. 16, 2011, Haskell, Barin Geoffry, et al.
Updated portions of prosecution history of U.S. Appl. No. 11/835,727, filed Jan. 19, 2011, Haskell, Barin Geoffry, et al.
Updated portions of prosecution history of U.S. Appl. No. 11/621,977, filed Mar. 7, 2011, Haskell, Barin Geoffry, et al.
Updated portions of prosecution history of U.S. Appl. No. 11/621,980, filed Jan. 12, 2011, Haskell, Barin Geoffry, et al.
Portions of prosecution history of U.S. Appl. No. 11/779,615, filed Mar. 9, 2011, Haskell, Barin Geoffry, et al.
Portions of prosecution history of U.S. Appl. No. 11/779,660, filed Mar. 8, 2011, Haskell, Barin Geoffry, et al.
Updated portions of prosecution history of EP03764499, Mar. 24, 2010 (mailing date), Apple Inc.
Updated portions of prosecution history of EP08005966, Mar. 10, 2011 (mailing date), Apple Inc.
Updated portions of prosecution history of EP03812763, Mar. 15, 2011 (mailing date), Apple Inc.
SG Examination Report for SG 200702807-9, Jan. 10, 2011 (mailing date), Apple Inc.
Author Unknown, "Working Draft No. 2, Revision 0 (WD-2)," Joint Video Team (JVT) of ISO/IEC MPEG and ITU-T VCEG, Jan. 29-Feb. 1, 2002, JVT-B118r1.
Updated portions of prosecution history of U.S. Appl. No. 11/835,732, mailed Aug. 17, 2011, Haskell et al.
Updated portions of prosecution history of U.S. Appl. No. 11/621,980, mailed Aug. 15, 2011, Haskell et al.
Updated portions of prosecution history of AU2003256494, mailed Dec. 31, 2007, Apple Inc.
Updated portions of prosecutions history of AU2008201106, mailed Jan. 31, 2011, Apple Inc.
Updated portions of prosecution history of CA2491741, mailed Jul. 2, 2009, Apple Inc.
Portions of prosecution history of CA2629246, mailed Oct. 19, 2010, Apple Inc.
Updated portions of prosecution history of EP08005966, mailed Aug. 30, 2011, Apple Inc.
Portions of prosecution history of AG200500663-0, mailed Apr. 16, 2007, Apple Inc.
Updated portions of prosecution history of SG200702807-9, mailed Sep. 23, 2010, Apple Inc.
Portions of prosecution history of SG201006997-9, mailed May 12, 2011, Apple Inc.
Updated portions of prosecution history of AU2003258142, mailed Jan. 14, 2009, Apple Inc.
Updated portions of prosecution history of AU2009202255, mailed Aug. 30, 2011, Apple Inc.
Updated portions of prosecutions history of CA2502004, mailed Jul. 15, 2011, Apple Inc.
Updated portions of prosecution history of EP03812763, mailed Aug. 12, 2011, Apple Inc.
Portions of prosecution history of SG200502548-1, mailed Jul. 6, 2007, Apple Computer, Inc.
U.S. Appl. No. 13/161,473, mailed Jun. 15, 2011, Haskell, Barin Geoffry, et al.
U.S. Appl. No. 13/161,474, mailed Jun. 15, 2011, Haskell, Barin Geoffry, et al.
U.S. Appl. No. 13/161,476, mailed Jun. 15, 2011, Haskell, Barin Geoffry, et al.
U.S. Appl. No. 13/161,478, mailed Jun. 15, 2011, Haskell, Barin Geoffry, et al.
U.S. Appl. No. 13/161,480, mailed Jun. 15, 2011, Haskell, Barin Geoffry, et al.
U.S. Appl. No. 13/161,481, mailed Jun. 15, 2011, Haskell, Barin Geoffry, et al.
U.S. Appl. No. 13/161,482, mailed Jun. 15, 2011, Haskell, Barin Geoffry, et al.
U.S. Appl. No. 13/161,484, mailed Jun. 15, 2011, Haskell, Barin Geoffry, et al.
U.S. Appl. No. 13/161,486, mailed Jun. 15, 2011, Haskell, Barin Geoffry, et al.
U.S. Appl. No. 13/161,491, mailed Jun. 15, 2011, Haskell, Barin Geoffry, et al.
U.S. Appl. No. 13/161,494, mailed Jun. 15, 2011, Haskell, Barin Geoffry, et al.
Updated portions of prosecution history of U.S. Appl. No. 11/779,615, mailed May 13, 2011, Haskell, Barin Geoffry, et al.
Updated portions of prosecution history of U.S. Appl. No. 11/779,660, mailed May 9, 2011, Haskell, Barin Geoffry, et al.
Updated portions of prosecution history of U.S. Appl. No. 11/835,727, mailed Apr. 13, 2011, Haskell, Barin Geoffry, et al.
Updated portions of prosecution history of U.S. Appl. No. 11/835,732, mailed Aug. 8, 2011, Haskell, Barin Geoffry, et al.
Updated portions of prosecution history of U.S. Appl. No. 10/792,514, maield Jan. 9, 2008, Haskell, Barin Geoffry, et al.
Updated portions of prosecution history U.S. Appl. No. 11/621,977, mailed Aug. 4, 2011, Haskell, Barin Geoffry, et al.
Updated portions of prosecution history of U.S. Appl. No. 11/321,980, mailed May 13, 2011, Haskell, Barin Geoffry, et al.
Portions of prosecutin history of AU2003256494, mailed Aug. 16, 2006, Apple Inc.
Updated portions of prosecution history of AU2008201106, mailed Mar. 3, 2010, Apple Inc.
Updated portions of prosecution history of EP03764499, mailed Sep. 9, 2010, Apple Inc.
Updated portions of prosecution history of EP08005966, mailed Aug. 5, 2011, Apple Inc.
Portions of prosecution history of EP10177289, mailed Jun. 10, 2011, Apple Inc.
Portions of prosecution history of EP10177276, mailed Jun. 10, 2011, Apple Inc.
Portions of prosecution history of EP11152144, mailed Jun. 14, 2011, Apple Inc.
Portions of prosecution history of EP11152174, mailed Jun. 15, 2011, Apple Inc.
Portions of prosecution history of EP11152176, mailed Jun. 14, 2011, Apple Inc.
Portions of prosecution history of EP11155467, mailed Jun. 14, 2011, Apple Inc.
Portions of prosecution history of EP11155464, mailed Jun. 14, 2011, Apple Inc.
Portions of prosecution history of EP11155463, mailed Jun. 14, 2011, Apple Inc.
Portions of prosecution history of EP11155462, mailed Jun. 14, 2011, Apple Inc.
Portions of prosecution history of EP11155493, mailed Jun. 14, 2011, Apple Inc.
Portions of prosecution history of EP11155498, mailed Jun. 15, 2011, Apple Inc.
Portions of prosecution history of EP11155492, mailed Jun. 14, 2011, Apple Inc.

Portions of prosecution history of EP11155491, mailed Jun. 14, 2011, Apple Inc.
Portions of prosecution history of EP11155479, mailed Jun. 14, 2011, Apple Inc.
Portions of prosecution history of EP11155487, filed Jun. 14, 2011, Apple Inc.
Portions of prosecution history of EP11155489, mailed Jun. 14, 2011, Apple Inc.
Portions of prosecution history of EP11155490, mailed Jun. 14, 2011, Apple Inc.
Portions of prosecution history of EP11155494, mailed Jun. 14, 2011, Apple Inc.
Portions of prosecution history of EP11155431, mailed Jun. 14, 2011, Apple Inc.
Portions of prosecution history of EP11155434, mailed Jun. 14, 2011, Apple Inc.
Portions of prosecution history of EP11155437, mailed Jun. 14, 2011, Apple Inc.
Portions of prosecution history of EP11155440, mailed Jun. 14, 2011, Apple Inc.
Portions of prosecution history of EP11155441, mailed Jun. 14, 2011, Apple Inc.
Portions of prosecution history of EP11155442, mailed Jun. 14, 2011, Apple Inc.
Portions of prosecution history of EP11155444, mailed Jun. 14, 2011, Apple Inc.
Portions of prosecution history of EP11155445, mailed Jun. 14, 2011, Apple Inc.
Portions of prosecution history of EP11155447, mailed Jun. 9, 2011, Apple Inc.
Portions of prosecution history of EP11155448, mailed Jun. 14, 2011, Apple Inc.
Portions of prosecution history of EP11155496, mailed Jun. 14, 2011, Apple Inc.
Portions of prosecution history of EP11155497, mailed Jun. 28, 2011, Apple Inc.
Portions of prosecution history of EP11155376, mailed Jun. 14, 2011, Apple Inc.
Portions of prosecution history of EP11155377, mailed Jun. 15, 2011, Apple Inc.
Portions of prosecution history of EP11155378, mailed Jun. 15, 2011, Apple Inc.
Portions of prosecution history of EP11155381, mailed Jun. 15, 2011, Apple Inc.
Portions of prosecution history of EP11155383, mailed Jun. 15, 2011, Apple Inc.
Portions of prosecution history of EP11155384, mailed Jun. 14, 2011, Apple Inc.
Portions of prosecution history of EP11155385, mailed Jun. 14, 2011, Apple Inc.
Portions of prosecution history of EP11155386, mailed Jun. 15, 2011, Apple.
Portions of prosecution history of EP11155408, mailed Jun. 14, 2011, Apple Inc.
Portions of prosecution history of EP11155409, mailed Jun. 14, 2011, Apple Inc.
Portions of prosecution history of EP11155414, mailed Jun. 14, 2011, Apple Inc.
Portions of prosecution history of EP11155387, mailed Jun. 15, 2011, Apple Inc.
Portions of prosecution history of EP11155388, mailed Jun. 15, 2011, Apple Inc.
Portions of prosecution history of AU2003258142, mailed Apr. 15, 2008, Apple Inc.
Portions of prosecution history of AU2009202255, mailed Mar. 3, 2011, Apple Inc.
Portions of prosecution history of CA25020004, dated Apr. 15, 2011, Apple Inc.
Updated portions of prosecution history of EP03812763, mailed Jul. 11, 2011, Apple Inc.
Haskell, Barry G., et al.,"Variable Accuracy Inter-Picture Timing Specification for Video," Joint Video Team (JVT) of ISO/IEC MPEG & ITU-T VCEG (ISO/IEC JTC1/SC29/WG11 and ITU-T SG16 Q.6), Jul. 22-26, 2002, JVT-D124r1.
Jeon, Byeong-Moon, "B picture coding for sequence with repeating scene changes," Joint Video Team (JVT) of ISO/IEC MPEG & ITU-T VCEG (ISO/IEC JTC1/SC29/WG11 and ITU-T SG16 Q.6), May 6-10, 2002, JVT-C120.
Kondo, Satoshi, et al., "New Prediction Method to Improve B-picture Coding Efficiency," ITU-Telecommunications Standardization Sector, Dec. 4-6, 2001, VCEG-O26.
Kondo, Satoshi, et al., "Proposal of Minor Changes to Multi-Frame Buffering Syntax for Improving Coding Efficiency of B-pictures," Joint Video Team (JVT) of ISO/IEC MPEG & ITU-T VCEG, Jan. 29-Feb. 1, 2002, JVT-B057.
Sullivan, Gary, "(Draft) Report of Fairfax Meeting," Joint Video Team (JVT) of ISO/IEC MPEG & ITU-T VVEEG, May 6-10, 2002, JVT-O001d3.

* cited by examiner

METHOD AND APPARATUS FOR VARIABLE ACCURACY INTER-PICTURE TIMING SPECIFICATION FOR DIGITAL VIDEO ENCODING WITH REDUCED REQUIREMENTS FOR DIVISION OPERATIONS

CLAIM OF BENEFIT TO PRIOR APPLICATIONS

This Application is a continuation of U.S. patent application Ser. No. 10/792,514, entitled "METHOD AND APPARATUS FOR VARIABLE ACCURACY INTER-PICTURE TIMING SPECIFICATION FOR DIGITAL VIDEO ENCODING WITH REDUCED REQUIREMENTS FOR DIVISION OPERATIONS", filed Mar. 2, 2004, now issued as U.S. Pat. No. 7,339,991. U.S. patent application Ser. No. 10/792,514 is a continuation application of U.S. patent application Ser. No. 10/313,773, now issued as U.S. Pat. No. 6,728,315, entitled "METHOD AND APPARATUS FOR VARIABLE ACCURACY INTER-PICTURE TIMING SPECIFICATION FOR DIGITAL VIDEO ENCODING WITH REDUCED REQUIREMENTS FOR DIVISION OPERATIONS", filed Dec. 6, 2002. U.S. patent application Ser. No. 10/313,773 claims priority to U.S. Provisional Application 60/398,625, filed Jul. 24, 2002. U.S. patent application Ser. No. 10/792,514, now issued as U.S. Pat. No. 7,339,991, U.S. patent application Ser. No. 10/313,773, now issued as U.S. Pat. No. 6,728,315, and U.S. Provisional Patent Application 60/398,625 are incorporated herein by reference.

CROSS REFERENCE TO RELATED APPLICATIONS

This Application is related to U.S. patent application Ser. No. 10/313,773, filed Dec. 6, 2002, now issued as U.S. Pat. No. 6,728,315; U.S. patent application Ser. No. 10/792,514, filed Mar. 2, 2004, now issued as U.S. Pat. No. 7,339,991; U.S. patent application Ser. No. 11/621,977, filed Jan. 10, 2007, now published as U.S. Publication 2007/0183501; U.S. patent application Ser. No. 11/621,980, filed Jan. 10, 2007, now published as U.S. Publication 2007/0183503; U.S. patent application Ser. No. 10/291,320, filed Nov. 8, 2002, now issued as U.S. Pat. No. 7,088,776; U.S. patent application Ser. No. 10/792,669, filed Mar. 2, 2004, now issued as U.S. Pat. No. 7,292,636; U.S. patent application Ser. No. 11/621,969, filed Jan. 10, 2007, now issued as U.S. Pat. No. 7,903,730; U.S. patent application Ser. No. 11/621,971, filed Jan. 10, 2007, now issued as U.S. Pat. No. 7,826,528; and U.S. patent application Ser. No. 11/621,974, filed Jan. 10, 2007, now issued as U.S. Pat. No. 7,668,240.

FIELD OF THE INVENTION

The present invention relates to the field of multimedia compression systems. In particular the present invention discloses methods and systems for specifying variable accuracy inter-picture timing with reduced requirements for processor intensive division operation.

BACKGROUND OF THE INVENTION

Digital based electronic media formats are finally on the cusp of largely replacing analog electronic media formats. Digital compact discs (CDs) replaced analog vinyl records long ago. Analog magnetic cassette tapes are becoming increasingly rare. Second and third generation digital audio systems such as Mini-discs and MP3 (MPEG Audio-layer 3) are now taking market share from the first generation digital audio format of compact discs.

The video media formats have been slower to move to digital storage and digital transmission formats than audio media. The reason for this slower digital adoption has been largely due to the massive amounts of digital information required to accurately represent acceptable quality video in digital form and the fast processing capabilities needed to encode compressed video. The massive amounts of digital information needed to accurately represent video require very high-capacity digital storage systems and high-bandwidth transmission systems.

However, video is now rapidly moving to digital storage and transmission formats. Faster computer processors, high-density storage systems, and new efficient compression and encoding algorithms have finally made digital video transmission and storage practical at consumer price points. The DVD (Digital Versatile Disc), a digital video system, has been one of the fastest selling consumer electronic products in years. DVDs have been rapidly supplanting Video-Cassette Recorders (VCRs) as the pre-recorded video playback system of choice due to their high video quality, very high audio quality, convenience, and extra features. The antiquated analog NTSC (National Television Standards Committee) video transmission system is currently in the process of being replaced with the digital ATSC (Advanced Television Standards Committee) video transmission system.

Computer systems have been using various different digital video encoding formats for a number of years. Specifically, computer systems have employed different video coder/decoder methods for compressing and encoding or decompressing and decoding digital video, respectively. A video coder/decoder method, in hardware or software implementation, is commonly referred to as a "CODEC".

Among the best digital video compression and encoding systems used by computer systems have been the digital video systems backed by the Motion Pictures Expert Group commonly known by the acronym MPEG. The three most well known and highly used digital video formats from MPEG are known simply as MPEG-1, MPEG-2, and MPEG-4. VideoCDs (VCDs) and early consumer-grade digital video editing systems use the early MPEG-1 digital video encoding format. Digital Versatile Discs (DVDs) and the Dish Network brand Direct Broadcast Satellite (DBS) television broadcast system use the higher quality MPEG-2 digital video compression and encoding system. The MPEG-4 encoding system is rapidly being adapted by the latest computer based digital video encoders and associated digital video players.

The MPEG-2 and MPEG-4 standards compress a series of video frames or video fields and then encode the compressed frames or fields into a digital bitstream. When encoding a video frame or field with the MPEG-2 and MPEG-4 systems, the video frame or field is divided into a rectangular grid of pixelblocks. Each pixelblock is independently compressed and encoded.

When compressing a video frame or field, the MPEG-4 standard may compress the frame or field into one of three types of compressed frames or fields: Intra-frames (I-frames), Unidirectional Predicted frames (P-frames), or Bi-Directional Predicted frames (B-frames). Intra-frames completely independently encode an independent video frame with no reference to other video frames. P-frames define a video frame with reference to a single previously displayed video frame. B-frames define a video frame with reference to both a video frame displayed before the current frame and a video frame to be displayed after the current frame. Due to their efficient usage of redundant video information, P-frames and B-frames generally provide the best compression.

SUMMARY OF THE INVENTION

A method and apparatus for performing motion estimation in a video codes is disclosed. Specifically, the present invention discloses a system that quickly calculates estimated motion vectors in a very efficient manner without requiring an excessive number of division operations.

In one embodiment, a first multiplicand is determined by multiplying a first display time difference between a first video picture and a second video picture by a power of two scale value. This step scales up a numerator for a ratio. Next, the system determines a scaled ratio by dividing that scaled numerator by a second first display time difference between said second video picture and a third video picture. The scaled ratio is then stored to be used later for calculating motion vector estimations. By storing the scaled ratio, all the estimated motion vectors can be calculated quickly with good precision since the scaled ratio saves significant bits and reducing the scale is performed by simple shifts thus eliminating the need for time consuming division operations.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and system for specifying Variable Accuracy Inter-Picture Timing in a multimedia compression and encoding system with reduced requirements for division operations is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG multimedia compression and encoding system. However, the same techniques can easily be applied to other types of compression and encoding systems.

Multimedia Compression and Encoding Overview

Figure 1:
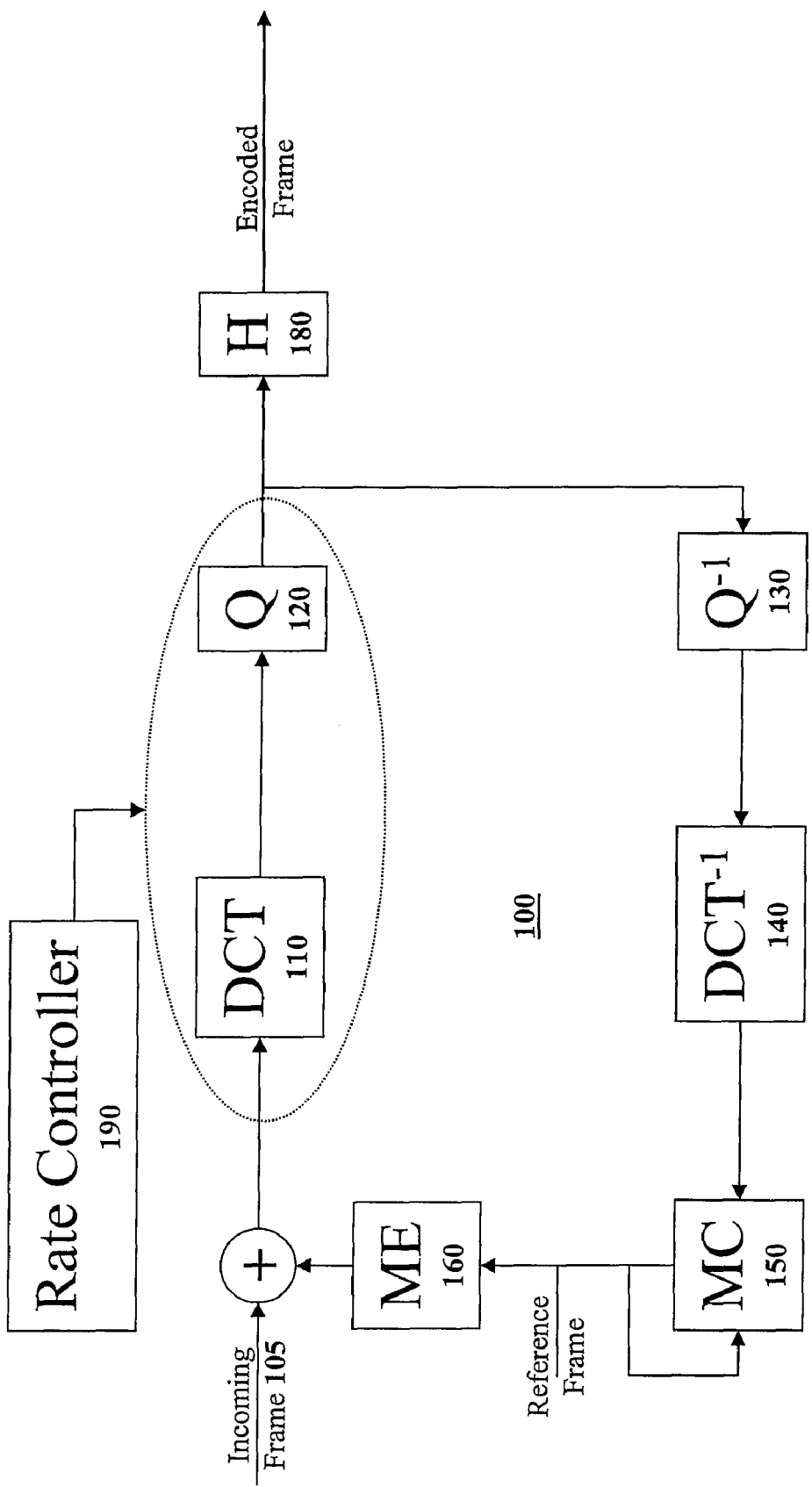
FIG. 1 illustrates a high-level block diagram of one possible digital video encoder system.

FIG. 1 illustrates a high-level block diagram of a typical digital video encoder 100 as is well known in the art. The digital video encoder 100 receives an incoming video stream of video frames 105 at the left of the block diagram. The digital video encoder 100 partitions each video frame into a grid of pixelblocks. The pixelblocks are individually compressed. Various different sizes of pixelblocks may be used by different video encoding systems. For example, different pixelblock resolutions include 8×8, 8×4, 16×8, 4×4, etc. Furthermore, pixelblocks are occasionally referred to as 'macroblocks.' This document will use the term pixelblock to refer to any block of pixels of any size.

A Discrete Cosine Transformation (DCT) unit 110 processes each pixelblock in the video frame. The frame may be processed independently (an intra-frame) or with reference to information from other frames received from the motion compensation unit (an inter-frame). Next, a Quantizer (Q) unit 120 quantizes the information from the Discrete Cosine Transformation unit 110. Finally, the quantized video frame is then encoded with an entropy encoder (H) unit 180 to produce an encoded bitstream. The entropy encoder (H) unit 180 may use a variable length coding (VLC) system.

Since an inter-frame encoded video frame is defined with reference to other nearby video frames, the digital video encoder 100 needs to create a copy of how each decoded frame will appear within a digital video decoder such that inter-frames may be encoded. Thus, the lower portion of the digital video encoder 100 is actually a digital video decoder system. Specifically, an inverse quantizer ($Q^{-1}$) unit 130 reverses the quantization of the video frame information and an inverse Discrete Cosine Transformation ($DCT^{-1}$) unit 140 reverses the Discrete Cosine Transformation of the video frame information. After all the DCT coefficients are reconstructed from inverse Discrete Cosine Transformation ($DCT^{-1}$) unit 140, the motion compensation unit will use that information, along with the motion vectors, to reconstruct the encoded video frame. The reconstructed video frame is then used as the reference frame for the motion estimation of the later frames.

The decoded video frame may then be used to encode inter-frames (P-frames or B-frames) that are defined relative to information in the decoded video frame. Specifically, a motion compensation (MC) unit 150 and a motion estimation (ME) unit 160 are used to determine motion vectors and generate differential values used to encode inter-frames.

A rate controller 190 receives information from many different components in a digital video encoder 100 and uses the information to allocate a bit budget for each video frame. The rate controller 190 should allocate the bit budget in a manner that will generate the highest quality digital video bit stream that that complies with a specified set of restrictions. Specifically, the rate controller 190 attempts to generate the highest quality compressed video stream without overflowing buffers (exceeding the amount of available memory in a video decoder by sending more information than can be stored) or underflowing buffers (not sending video frames fast enough such that a video decoder runs out of video frames to display).

Digital Video Encoding with Pixelblocks

In some video signals the time between successive video pictures (frames or fields) may not be constant. (Note: This document will use the term video pictures to generically refer to video frames or video fields.) For example, some video pictures may be dropped because of transmission bandwidth constraints. Furthermore, the video timing may also vary due to camera irregularity or special effects such as slow motion or fast motion. In some video streams, the original video source may simply have non-uniform inter-picture times by design. For example, synthesized video such as computer graphic animations may have non-uniform timing since no arbitrary video timing is imposed by a uniform timing video capture system such as a video camera system. A flexible digital video encoding system should be able to handle non-uniform video picture timing.

As previously set forth, most digital video encoding systems partition video pictures into a rectangular grid of pixelblocks. Each individual pixelblock in a video picture is independently compressed and encoded. Some video coding standards, e.g., ISO MPEG or ITU H.264, use different types of predicted pixelblocks to encode video pictures. In one scenario, a pixelblock may be one of three types:

1. I-pixelblock—An Intra (I) pixelblock uses no information from any other video pictures in its coding (it is completely self-defined);
2. P-pixelblock—A unidirectionally predicted (P) pixelblock refers to picture information from one preceding video picture; or
3. B-pixelblock—A bi-directional predicted (B) pixelblock uses information from one preceding picture and one future video picture.

If all the pixelblocks in a video picture are Intra-pixelblocks, then the video picture is an Intra-frame. If a video picture only includes unidirectional predicted macro blocks or intra-pixelblocks, then the video picture is known as a P-frame. If the video picture contains any bi-directional predicted pixelblocks, then the video picture is known as a B-frame. For the simplicity, this document will consider the case where all pixelblocks within a given picture are of the same type.

An example sequence of video pictures to be encoded might be represented as:

$I_1 B_2 B_3 B_4 P_5 B_6 B_7 B_8 B_9 P_{10} B_{11} P_{12} B_{13} I_{14} \ldots$ where the letter (I, P, or B) represents if the video picture is an I-frame, P-frame, or B-frame and the number represents the camera order of the video picture in the sequence of video pictures. The camera order is the order in which a camera recorded the video pictures and thus is also the order in which the video pictures should be displayed (the display order).

Figure 2:
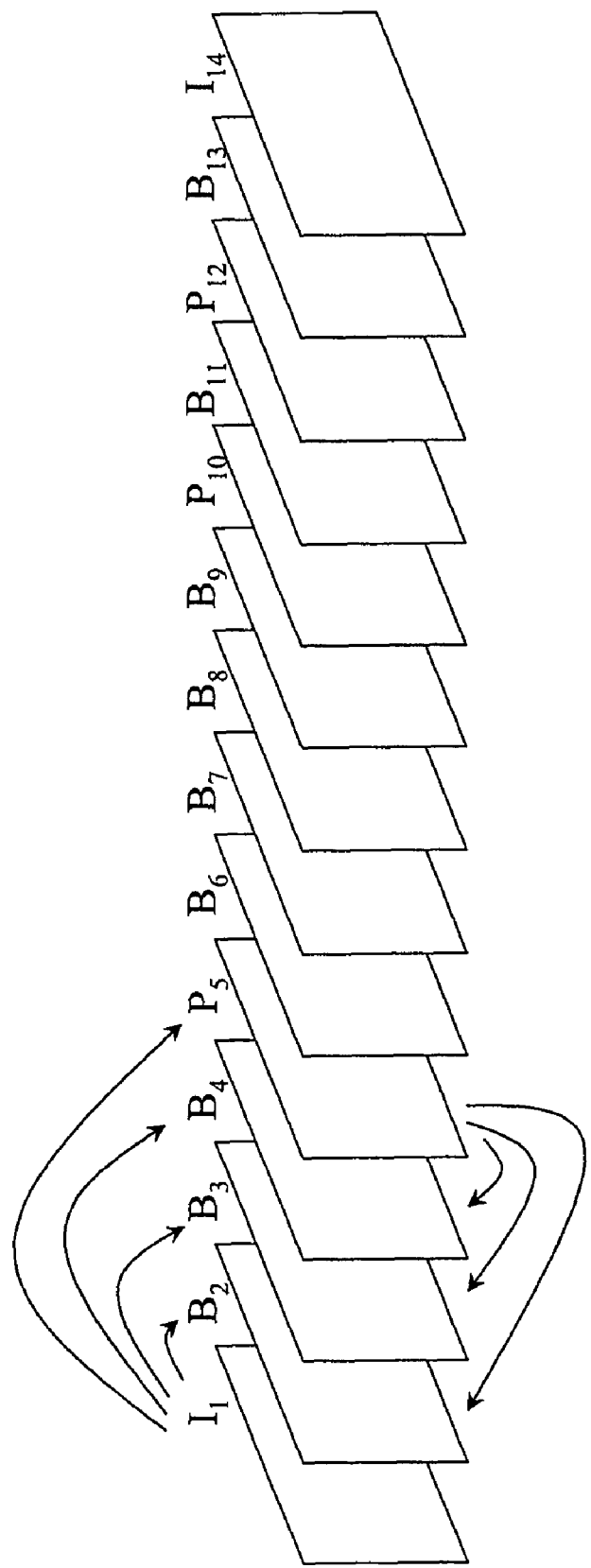
FIG. 2 illustrates a series of video pictures in the order that the pictures should be displayed wherein the arrows connecting different pictures indicate inter-picture dependency created using motion compensation.

The previous example series of video pictures is graphically illustrated in FIG. 2. Referring to FIG. 2, the arrows indicate that pixelblocks from a stored picture (I-frame or P-frame in this case) are used in the motion compensated prediction of other pictures.

In the scenario of FIG. 2, no information from other pictures is used in the encoding of the intra-frame video picture $I_1$. Video picture $P_5$ is a P-frame that uses video information from previous video picture $I_1$ in its coding such that an arrow is drawn from video picture $I_1$ to video picture $P_5$. Video picture $B_2$, video picture $B_3$, video picture $B_4$ all use information from both video picture $I_1$ and video picture $P_5$ in their coding such that arrows are drawn from video picture $I_1$ and video picture $P_5$ to video picture $B_2$, video picture $B_3$, and video picture $B_4$. As stated above the inter-picture times are, in general, not the same.

Since B-pictures use information from future pictures (pictures that will be displayed later), the transmission order is usually different than the display order. Specifically, video pictures that are needed to construct other video pictures should be transmitted first. For the above sequence, the transmission order might be:

$I_1 P_5 B_2 B_3 B_4 P_{10} B_6 B_7 B_8 B_9 P_{12} B_{11} I_{14} B_{13} \ldots$

Figure 3:
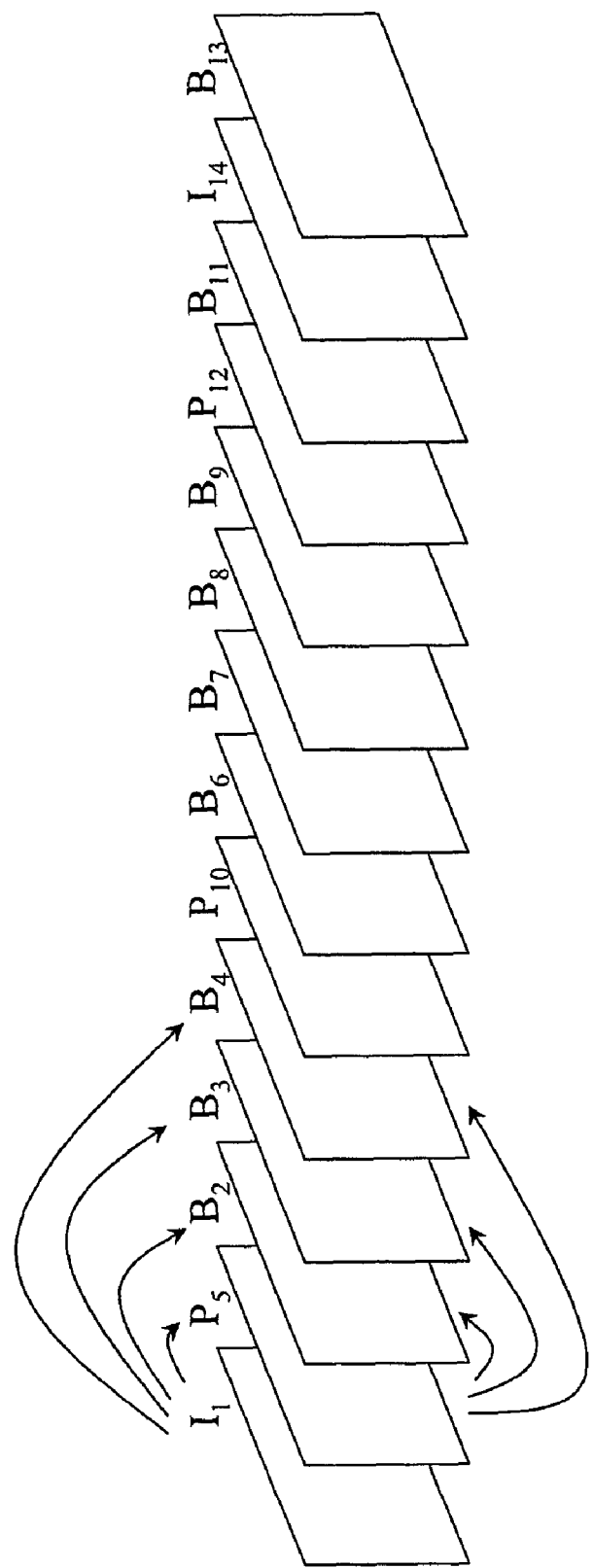
FIG. 3 illustrates the video pictures from FIG. 2 listed in a preferred transmission order of pictures wherein the arrows connecting different pictures indicate inter-picture dependency created using motion compensation.

FIG. 3 graphically illustrates the preceding transmission order of the video pictures from FIG. 2. Again, the arrows in the figure indicate that pixelblocks from a stored video picture (I or P in this case) are used in the motion compensated prediction of other video pictures.

Referring to FIG. 3, the system first transmits I-frame $I_1$ which does not depend on any other frame. Next, the system transmits P-frame video picture $P_5$ that depends upon video picture $I_1$. Next, the system transmits B-frame video picture $B_2$ after video picture $P_5$ even though video picture $B_2$ will be displayed before video picture $P_5$. The reason for this is that when it comes time to decode video picture $B_2$, the decoder will have already received and stored the information in video pictures $I_1$ and $P_5$ necessary to decode video picture $B_2$. Similarly, video pictures $I_1$ and $P_5$ are ready to be used to decode subsequent video picture $B_3$ and video picture $B_4$. The receiver/decoder reorders the video picture sequence for proper display. In this operation I and P pictures are often referred to as stored pictures.

The coding of the P-frame pictures typically utilizes Motion Compensation, wherein a Motion Vector is computed for each pixelblock in the picture. Using the computed motion vector, a prediction pixelblock (P-pixelblock) can be formed by translation of pixels in the aforementioned previous picture. The difference between the actual pixelblock in the P-frame picture and the prediction pixelblock is then coded for transmission.

P-Pictures

The coding of P-Pictures typically utilize Motion Compensation (MC), wherein a Motion Vector (MV) pointing to a location in a previous picture is computed for each pixelblock in the current picture. Using the motion vector, a prediction pixelblock can be formed by translation of pixels in the aforementioned previous picture. The difference between the actual pixelblock in the P-Picture and the prediction pixelblock is then coded for transmission.

Each motion vector may also be transmitted via predictive coding. For example, a motion vector prediction may be formed using nearby motion vectors. In such a case, then the difference between the actual motion vector and the motion vector prediction is coded for transmission.

B-Pictures

Each B-pixelblock uses two motion vectors: a first motion vector referencing the aforementioned previous video picture and a second motion vector referencing the future video picture. From these two motion vectors, two prediction pixelblocks are computed. The two predicted pixelblocks are then combined together, using some function, to form a final predicted pixelblock. As above, the difference between the actual pixelblock in the B-frame picture and the final predicted pixelblock is then encoded for transmission.

As with P-pixelblocks, each motion vector (MV) of a B-pixelblock may be transmitted via predictive coding. Specifically, a predicted motion vector is formed using nearby motion vectors. Then, the difference between the actual motion vector and the predicted is coded for transmission.

However, with B-pixelblocks the opportunity exists for interpolating motion vectors from motion vectors in the nearest stored picture pixelblock. Such motion vector interpolation is carried out both in the digital video encoder and the digital video decoder.

This motion vector interpolation works particularly well on video pictures from a video sequence where a camera is slowly panning across a stationary background. In fact, such motion vector interpolation may be good enough to be used alone. Specifically, this means that no differential information needs be calculated or transmitted for these B-pixelblock motion vectors encoded using interpolation.

To illustrate further, in the above scenario let us represent the inter-picture display time between pictures i and j as $D_{i,j}$, i.e., if the display times of the pictures are $T_i$ and $T_j$, respectively, then $$D_{i,j}=T_i-T_j \text{ from which it follows that}$$

$$D_{i,k}=D_{i,j}+D_{j,k}$$

$$D_{i,k}=-D_{k,i}$$

Note that $D_{i,j}$ may be negative in some cases.

Thus, if $MV_{5,1}$ is a motion vector for a $P_5$ pixelblock as referenced to $I_1$, then for the corresponding pixelblocks in $B_2$, $B_3$ and $B_4$ the motion vectors as referenced to $I_1$ and $P_5$, respectively would be interpolated by $$MV_{2,1}=MV_{5,1}*D_{2,1}/D_{5,1}$$

$$MV_{5,2}=MV_{5,1}*D_{5,2}/D_{5,1}$$

$$MV_{3,1}=MV_{5,1}*D_{3,1}/D_{5,1}$$

$$MV_{5,3}=MV_{5,1}*D_{5,3}/D_{5,1}$$

$$MV_{4,1}=MV_{5,1}*D_{4,1}/D_{5,1}$$

$$MV_{5,4}=MV_{5,1}*D_{5,4}/D_{5,1}$$

Note that since ratios of display times are used for motion vector prediction, absolute display times are not needed. Thus, relative display times may be used for $D_{i,j}$ inter-picture display time values.

This scenario may be generalized, as for example in the H.264 standard. In the generalization, a P or B picture may use any previously transmitted picture for its motion vector prediction. Thus, in the above case picture $B_3$ may use picture $I_1$ and picture $B_2$ in its prediction. Moreover, motion vectors may be extrapolated, not just interpolated. Thus, in this case we would have:

$$MV_{3,1}=MV_{2,1}*D_{3,1}/D_{2,1}$$

Such motion vector extrapolation (or interpolation) may also be used in the prediction process for predictive coding of motion vectors.

Encoding Inter-Picture Display Times

The variable inter-picture display times of video sequences should be encoded and transmitted in a manner that renders it possible to obtain a very high coding efficiency and has selectable accuracy such that it meets the requirements of a video decoder. Ideally, the encoding system should simplify the tasks for the decoder such that relatively simple computer systems can decode the digital video.

The variable inter-picture display times are potentially needed in a number of different video encoding systems in order to compute differential motion vectors, Direct Mode motion vectors, and/or Implicit B Prediction Block Weighting.

The problem of variable inter-picture display times in video sequences is intertwined with the use of temporal references. Ideally, the derivation of correct pixel values in the output pictures in a video CODEC should be independent of the time at which that picture is decoded or displayed. Hence, timing issues and time references should be resolved outside the CODEC layer.

There are both coding-related and systems-related reasons underlying the desired time independence. In a video CODEC, time references are used for two purposes:

(1) To establish an ordering for reference picture selection; and (2) To interpolate motion vectors between pictures.

To establish an ordering for reference picture selection, one may simply send a relative position value. For example, the difference between the frame position N in decode order and the frame position M in the display order, i.e., N−M. In such an embodiment, time-stamps or other time references would not be required. To interpolate motion vectors, temporal distances would be useful if the temporal distances could be related to the interpolation distance. However, this may not be true if the motion is non-linear. Therefore, sending parameters other than temporal information for motion vector interpolation seems more appropriate.

In terms of systems, one can expect that a typical video CODEC is part of a larger system where the video CODEC coexists with other video (and audio) CODECs. In such multi-CODEC systems, good system layering and design requires that general functions, which are logically CODEC-independent such as timing, be handled by the layer outside the CODEC. The management of timing by the system and not by each CODEC independently is critical to achieving consistent handling of common functions such as synchronization. For instance in systems that handle more than one stream simultaneously, such as a video/audio presentation, timing adjustments may sometimes be needed within the streams in order to keep the different streams synchronized. Similarly, in a system that handles a stream from a remote system with a different clock timing adjustments may be needed to keep synchronization with the remote system. Such timing adjustments may be achieved using time stamps. For example, time stamps that are linked by means of "Sender Reports" from the transmitter and supplied in RTP in the RTP layer for each stream may be used for synchronization. These sender reports may take the form of:

Video RTP TimeStamp X is aligned with reference timestamp Y

Audio RTP TimeStamp W is aligned with reference timestamp Z

Wherein the wall-clock rate of the reference timestamps is known, allowing the two streams to be aligned. However, these timestamp references arrive both periodically and separately for the two streams, and they may cause some needed re-alignment of the two streams. This is generally achieved by adjusting the video stream to match the audio or vice-versa. System handling of time stamps should not affect the values of the pixels being displayed. More generally, system handling of temporal information should be performed outside the CODEC.

A Specific Example

As set forth in the previous section, the problem in the case of non uniform inter-picture times is to transmit the inter-picture display time values $D_{i,j}$ to the digital video receiver in an efficient manner. One method of accomplishing this goal is to have the system transmit the display time difference between the current picture and the most recently transmitted stored picture for each picture after the first picture. For error resilience, the transmission could be repeated several times within the picture. For example, the display time difference may be repeated in the slice headers of the MPEG or H.264 standards. If all slice headers are lost, then presumably other pictures that rely on the lost picture for decoding information cannot be decoded either.

Thus, with reference to the example of the preceding section, a system would transmit the following inter-picture display time values:

$D_{5,1}\ D_{2,5}\ D_{3,5}\ D_{4,5}\ D_{10,5}\ D_{6,10}\ D_{7,10}\ D_{8,10}\ D_{9,10}\ D_{12,10}\ D_{11,12}\ D_{14,12}\ D_{13,14}\ldots$ For the purpose of motion vector estimation, the accuracy requirements for the inter-picture display times $D_{i,j}$ may vary from picture to picture. For example, if there is only a single B-frame picture $B_6$ halfway between two P-frame pictures $P_5$ and $P_7$, then it suffices to send only:

$$D_{7,5}=2 \text{ and } D_{6,7}=-1$$

where the $D_{i,j}$ inter-picture display time values are relative time values.

If, instead, video picture $B_6$ is only one quarter the distance between video picture $P_5$ and video picture $P_7$ then the appropriate $D_{i,j}$ inter-picture display time values to send would be:

$$D_{7,5}=4 \text{ and } D_{6,7}=-1$$

Note that in both of the preceding examples, the display time between the video picture $B_6$ and video picture video picture $P_7$ (inter-picture display time $D_{6,7}$) is being used as the display time "unit" value. In the most recent example, the display time difference between video picture $P_5$ and picture video picture $P_7$ (inter-picture display time $D_{6,7}$) is four display time "units" ($4*D_{6,7}$)

Improving Decoding Efficiency

In general, motion vector estimation calculations are greatly simplified if divisors are powers of two. This is easily achieved in our embodiment if $D_{i,j}$ (the inter-picture time) between two stored pictures is chosen to be a power of two as graphically illustrated in FIG. 4. Alternatively, the estimation procedure could be defined to truncate or round all divisors to a power of two.

Figure 4:
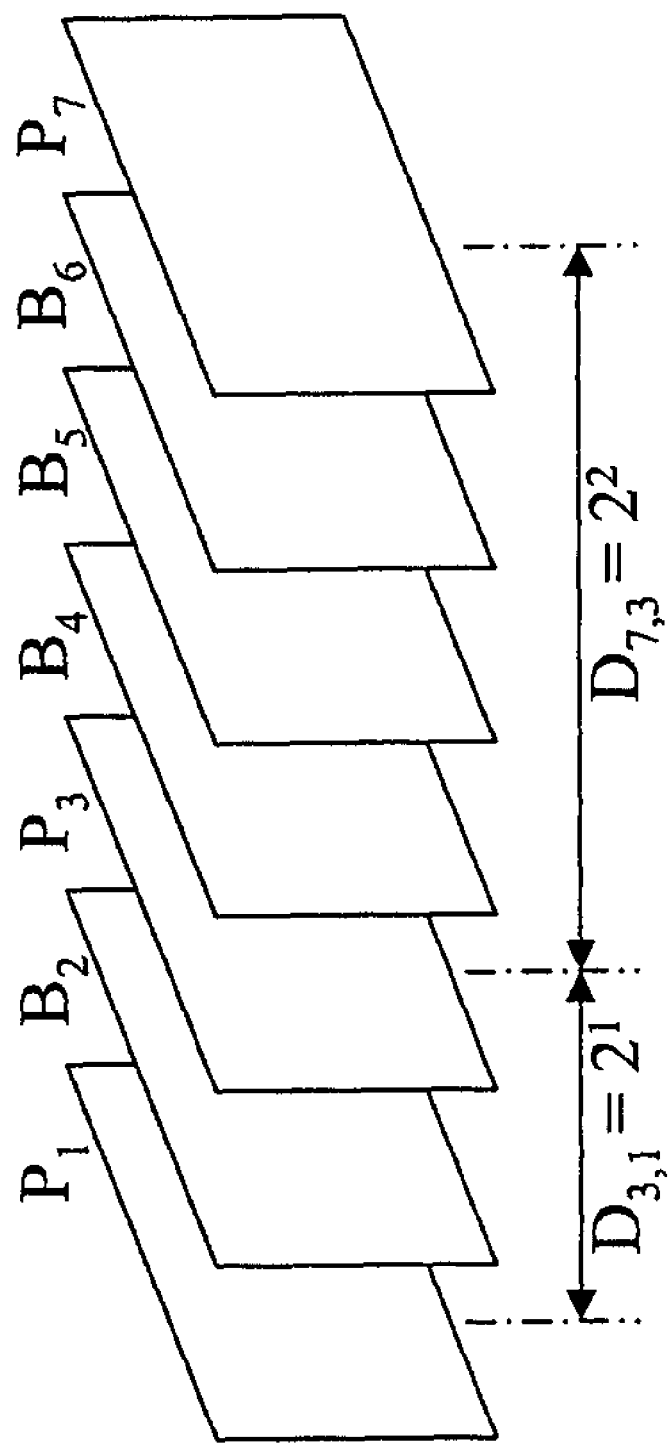
FIG. 4 graphically illustrates a series of video pictures wherein the distances between video pictures that reference each other are chosen to be powers of two.

In the case where an inter-picture time is to be a power of two, the number of data bits can be reduced if only the integer power (of two) is transmitted instead of the full value of the inter-picture time. FIG. 4 graphically illustrates a case wherein the distances between pictures are chosen to be powers of two. In such a case, the $D_{3,1}$ display time value of 2 between video picture $P_1$ and picture video picture $P_3$ is transmitted as 1 (since $2^1=2$) and the $D_{7,3}$ display time value of 4 between video picture $P_7$ and picture video picture $P_3$ can be transmitted as 2 (since $2^2=4$).

Alternatively, the motion vector interpolation of extrapolation operation can be approximated to any desired accuracy by scaling in such a way that the denominator is a power of two. (With a power of two in the denominator division may be performed by simply shifting the bits in the value to be divided.) For example, $$D_{5,4}/D_{5,1} \sim Z_{5,4}/P$$

Where the value P is a power of two and $Z_{5,4}=P*D_{5,4}/D_{5,1}$ is rounded or truncated to the nearest integer. The value of P may be periodically transmitted or set as a constant for the system. In one embodiment, the value of P is set as $P=2^8=256$.

The advantage of this approach is that the decoder only needs to compute $Z_{5,4}$ once per picture or in many cases the decoder may pre-compute and store the Z value. This allows the decoder to avoid having to divide by $D_{5,1}$ for every motion vector in the picture such that motion vector interpolation may be done much more efficiently. For example, the normal motion vector calculation would be:

$$MV_{5,4}=MV_{5,1}*D_{5,4}/D_{5,1}$$

But if we calculate and store $Z_{5,4}$ wherein $Z_{5,4}=P*D_{5,4}/D_{5,1}$ then $$MV_{5,4}=MV_{5,1}*Z_{5,4}/P$$

But since the P value has been chosen to be a power of two, the division by P is merely a simple shift of the bits. Thus, only a single multiplication and a single shift are required to calculate motion vectors for subsequent pixelblocks once the Z value has been calculated for the video picture. Furthermore, the system may keep the accuracy high by performing all divisions last such that significant bits are not lost during the calculation. In this manner, the decoder may perform exactly the same as the motion vector interpolation as the encoder thus avoiding any mismatch problems that might otherwise arise.

Since division (except for division by powers of two) is a much more computationally intensive task for a digital computer system than addition or multiplication, this approach can greatly reduce the computations required to reconstruct pictures that use motion vector interpolation or extrapolation.

In some cases, motion vector interpolation may not be used. However, it is still necessary to transmit the display order of the video pictures to the receiver/player system such that the receiver/player system will display the video pictures in the proper order. In this case, simple signed integer values for $D_{i,j}$ suffice irrespective of the actual display times. In some applications only the sign (positive or negative) may be needed to reconstruct the picture ordering.

The inter-picture times $D_{i,j}$ may simply be transmitted as simple signed integer values. However, many methods may be used for encoding the $D_{i,j}$ values to achieve additional compression. For example, a sign bit followed by a variable length coded magnitude is relatively easy to implement and provides coding efficiency.

One such variable length coding system that may be used is known as UVLC (Universal Variable Length Code). The UVLC variable length coding system is given by the code words:

```
1 =           1
2 =       0 1 0
3 =       0 1 1
4 =   0 0 1 0 0
5 =   0 0 1 0 1
6 =   0 0 1 1 0
7 =   0 0 1 1 1
8 = 0 0 0 1 0 0 0...
```

Another method of encoding the inter-picture times may be to use arithmetic coding. Typically, arithmetic coding utilizes conditional probabilities to effect a very high compression of the data bits.

Thus, the present invention introduces a simple but powerful method of encoding and transmitting inter-picture display times and methods for decoding those inter-picture display times for use in motion vector estimation. The encoding of inter-picture display times can be made very efficient by using variable length coding or arithmetic coding. Furthermore, a desired accuracy can be chosen to meet the needs of the video codec, but no more.

The foregoing has described a system for specifying variable accuracy inter-picture timing in a multimedia compression and encoding system. It is contemplated that changes and modifications may be made by one of ordinary skill in the art, to the materials and arrangements of elements of the present invention without departing from the scope of the invention.

We claim:

1. A method comprising:
   receiving a bitstream comprising a plurality of encoded video pictures and at least one encoded order value; and computing a first motion vector for a first video picture, wherein said computed first motion vector is based on a scaled ratio and a second motion vector for a second video picture.

2. The method of claim 1, wherein the scaled ratio is based on a ratio between a first order difference value and a second order difference value.

3. The method of claim 1, wherein said order value is for specifying a position of at least one video picture in a sequence of video pictures.

4. The method of claim 3, wherein the sequence is for displaying the plurality of video pictures.

5. A decoder comprising:
   a module that receives a bitstream comprising a plurality of encoded video pictures and at least one encoded order value; and
   a module that computes a first motion vector for a first video picture, wherein said computed first motion vector is based on a scaled ratio and a second motion vector for a second video picture.

6. The decoder of claim 5, wherein the scaled ratio is based on a ratio between a first order difference value and a second order difference value.

7. The decoder of claim 5, wherein said order value is for specifying a position of at least one video picture in a sequence of video pictures.

8. The decoder of claim 7, wherein the sequence is for displaying the plurality of video pictures.

* * * * *